United States Patent
DiMucci-Flannery et al.

(10) Patent No.: US 11,968,956 B2
(45) Date of Patent: Apr. 30, 2024

(54) TELESCOPING PET RAMP

(71) Applicant: Uppy Puppy LLC, Englewood, CO (US)

(72) Inventors: Danielle DiMucci-Flannery, Englewood, CO (US); Kevin Flannery, Englewood, CO (US)

(73) Assignee: UPPY PUPPY LLC, Englewood, CO (US)

( * ) Notice: Subject to any disclaimer, the term of this patent is extended or adjusted under 35 U.S.C. 154(b) by 0 days.

(21) Appl. No.: 17/306,387

(22) Filed: May 3, 2021

(65) Prior Publication Data
US 2022/0349184 A1    Nov. 3, 2022

(51) Int. Cl.
*A01K 1/035* (2006.01)
*A01K 1/00* (2006.01)
*A01K 29/00* (2006.01)

(52) U.S. Cl.
CPC ............ *A01K 1/035* (2013.01); *A01K 1/0035* (2013.01); *A01K 29/00* (2013.01)

(58) Field of Classification Search
CPC ..................................................... A01K 1/035
See application file for complete search history.

(56) References Cited

U.S. PATENT DOCUMENTS

| | | | | |
|---|---|---|---|---|
| 9,775,326 | B1 * | 10/2017 | MacNeil | A01K 29/00 |
| 10,843,631 | B1 * | 11/2020 | Honeysett | B60R 3/02 |
| 2018/0178703 | A1 * | 6/2018 | Keck | B65G 69/30 |
| 2018/0228118 | A1 * | 8/2018 | Murray | A01K 1/0272 |
| 2018/0228121 | A1 * | 8/2018 | Murray | A01K 29/00 |
| 2019/0037799 | A1 * | 2/2019 | Murray | A01K 1/0272 |
| 2019/0150400 | A1 * | 5/2019 | Kumar | B65G 69/30 |
| 2019/0202364 | A1 * | 7/2019 | Bostwick | A01K 1/035 |
| 2021/0259198 | A1 * | 8/2021 | Kamlage | A01K 1/035 |
| 2021/0289743 | A1 * | 9/2021 | Specha | E06C 7/00 |

\* cited by examiner

*Primary Examiner* — Jessica B Wong
(74) *Attorney, Agent, or Firm* — Smith, Gambrell & Russell, LLP

(57) ABSTRACT

A telescoping pet ramp incudes a bottom frame that has a rectangular shape and fasteners to tether the telescoping pet ramp to an interior of a vehicle. The telescoping pet ramp includes a top frame, a platform, connectors, a ramp storage area, and a telescoping ramp. The top frame has four sides that create a rectangular shape and an opening between the four sides. The platform is attached to the top frame and covers the opening. Four or more connectors connect the top frame and the bottom frame. The ramp storage area is between the top frame and the bottom frame. The telescoping ramp is moveable with respect to a front of the top frame and a front of the bottom frame. The ramp storage area retains the telescoping ramp when the telescoping ramp is in a non-extended state.

18 Claims, 2 Drawing Sheets

TELESCOPING PET RAMP

BACKGROUND

Pets have increasingly become more mobile as they travel with their owners. A pet, however, may be unable to easily enter a vehicle. Conventional ramps and steps exist that may be used by a pet to enter and exit a vehicle. These ramps and steps are not attached to the vehicle. Accordingly, the ramps and steps may become dangerous to the occupants of the vehicle if the vehicle is involved in an accident. In addition, the ramps and steps take up the limited cargo space of vehicles. These steps and ramps may also be unwieldy to setup and use when holding onto a leash or a pet. A need exists for an improved pet ramp that is attached to a vehicle and that may be easily setup and stored within a vehicle.

DETAILED DESCRIPTION

As pets and their mobility have increased there is a need for a pet ramp that allows pets to easily enter and exit a vehicle. In addition, the pet ramp may be securely attached to a vehicle to prevent the pet ramp from becoming a projectile during an accident. In addition, disclosed embodiments avoid having to lift, fold, break down, carry, and reload the ramp into a vehicle. Further, disclosed pet ramps include a telescoping ramp that allows for differing angles between the ground and the ramp which allows the pet ramp to work in tight spaces. Smaller angles may also be used for pets that may have a difficult time walking up an incline. Thus, there exists a need for an improved ramp that allows easy operation and secure installation within a vehicle. In addition, there is a need for a ramp that supports different heights and different angles.

Figure 1:
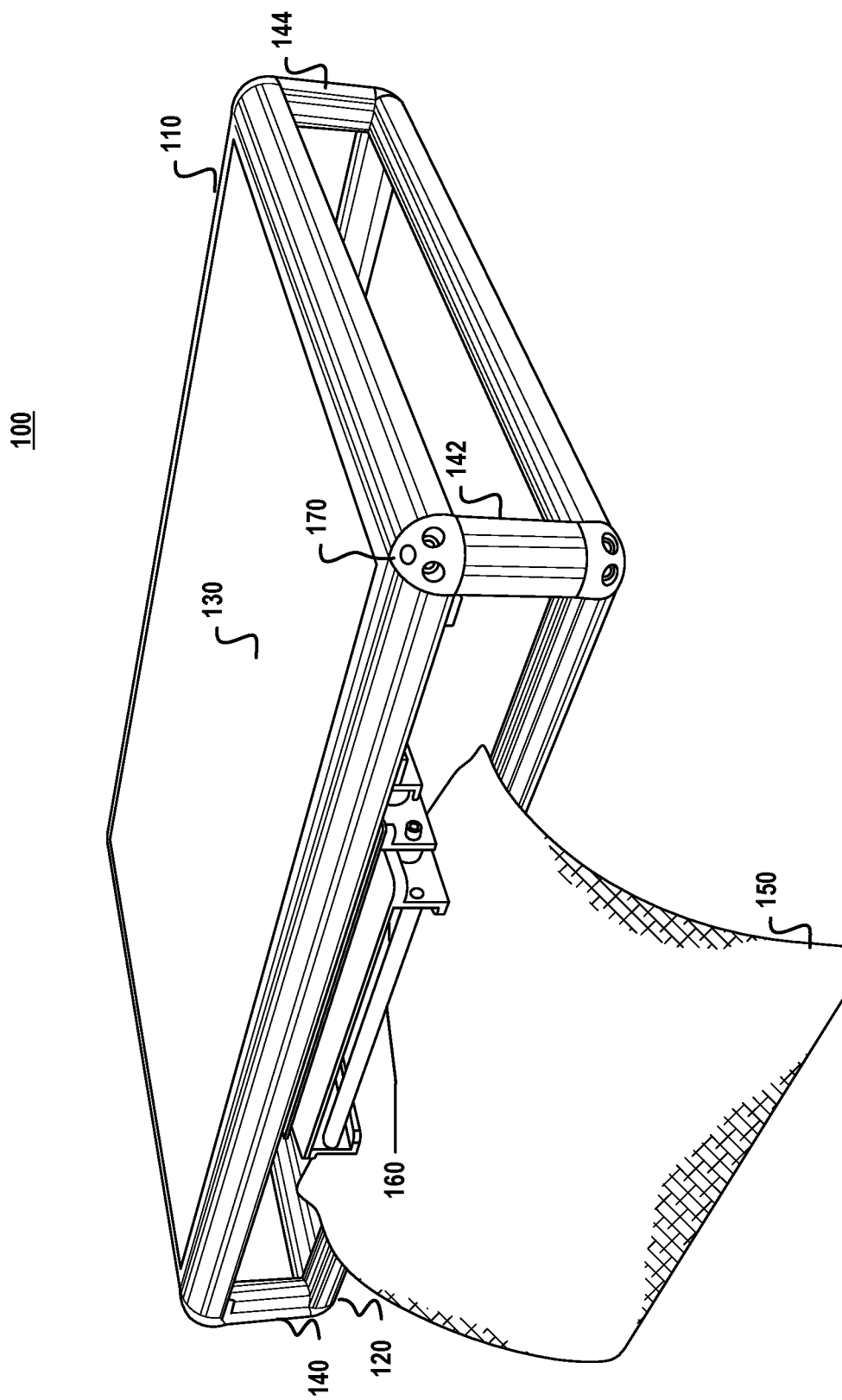
FIG. 1 is a perspective view of a pet ramp with a stored ramp in accordance with respective examples.

FIG. 1 is a perspective view of a pet ramp 100 with a stored ramp in accordance with respective examples. The pet ramp 100 includes a top frame 110. In an example, the top frame is rectangular shaped. The top frame 110 may be made up of four sides connected together with structural connectors. A corresponding bottom frame 120 is connected to the top frame 110 via vertical connectors 140, 142, and 144. A fourth vertical connector is not shown in FIG. 1. The top frame 110 and the bottom frame 120 may be made of radiused aluminum extrusion. In another example, the top frame 110 and the bottom frame 120 may be made of a carbon composite. The vertical connectors 140, 142, 144 make a storage area between the top frame 110 and the bottom frame 120. Within the storage area a telescoping ramp may be stored. A handle 160 is used to extend the telescoping ramp from the storage area. The telescoping ramp may be made of aluminum with stainless steel fasteners and fittings with nylon rollers. In another example, the telescoping ramp may be made of a carbon composite. A platform 130 may be installed between the sides of the top frame 110. The platform 130 is able to support the weight of a pet. The platform 130 may be waterproof. For example, the platform 130 may be made of composite PVC. In some examples, additional supports to the side of the telescoping ramp may be installed to provide additional support for the platform. The telescoping ramp may be installed such that the outermost rails or supports for the outermost rails go between the sides of the sides of the top frame 110. This provides additional support for the platform 130.

The pet ramp 100 may also includes a bumper protector 150. The bumper protector 150 may be attached to the bottom frame 120 or to the bottom of the support for the telescoping ramp. A connector (not shown) on the bumper protector may attach to the platform or to the top frame 110. The connector may be Velcro, one or more buttons, etc. When the bumper protector 150 is attached to the top frame 110 or platform 130, the bumper protector 150 secures the telescoping ramp in the non-extended position.

Figure 2:
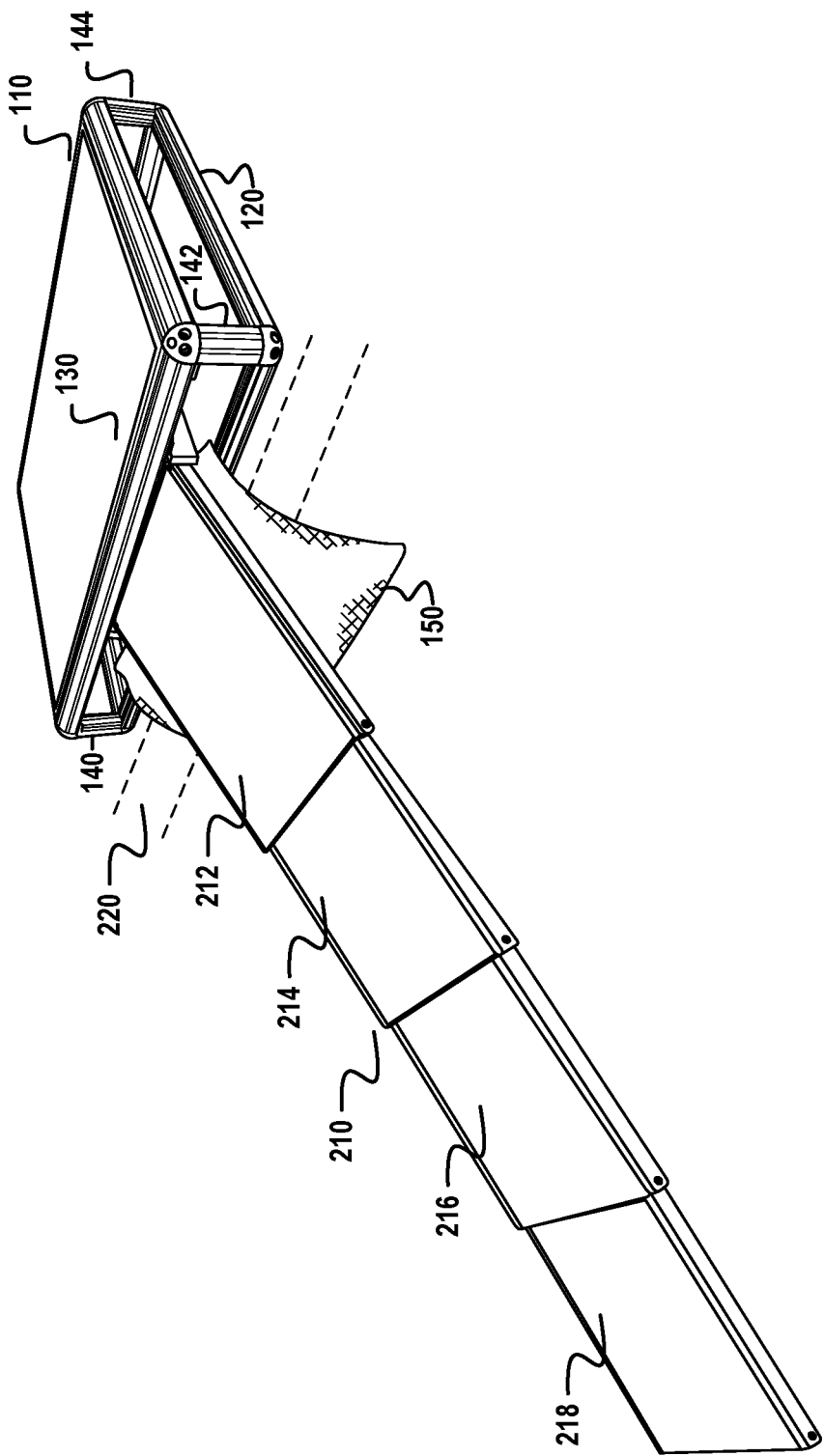
FIG. 2 is a perspective view of a pet ramp with an extended ramp in accordance with respective examples.

FIG. 2 is a perspective view of a pet ramp 200 with an extended ramp 210 in accordance with respective examples. The extended ramp 210 may include three or more panels. For example, the telescoping pet ramp may include 3, 4, 5, or 6 panels. The illustrated extended ramp 210 includes panels 212, 214, 216, and 218. The panels 212, 214, 216, and 218 may be made from aluminum or carbon composite. A carpet for traction may be installed on each the panels. For example, a rubber based carpet may be adhered to each of the panels.

As the panels are telescoping relative to one another, panel 218 slides underneath panel 216 when the telescoping pet ramp is moved into its non-extended position. Panels 216 and 218 slide underneath panel 214, and the panels 214, 216, and 218 slide underneath panel 212. The panels 212, 214, 216, and 218 may then slide into the pet ramp storage area underneath the platform 130. The bumper protector 150 is shown protecting a bumper 220 of a vehicle in which the pet ramp is installed. The bumper is shown with dotted lines as the bumper 220 is not part of the pet ramp 200.

In an example, a telescoping pet ramp includes a bottom frame that has a rectangular shape. In addition, the bottom frame includes two or more fasteners that are used to tether the telescoping pet ramp to an interior of a vehicle. For example, the fasteners may be attached to latches that are part of the cargo area of a vehicle. In an example, the bottom frame includes four fasteners used to secure the telescoping pet ramp in a cargo area of a vehicle. Once tethered to the vehicle, the telescoping pet ramp is designed to remain installed in the cargo area of the vehicle.

A top frame has four sides and creates a rectangular shape that has an opening between the four sides. In an example, the top frame and the bottom frame have the same dimensions. In another example, the bottom frame may be smaller based on the bottom of the cargo area with a larger top frame to accommodate a larger cargo area above the bottom of the cargo area. A platform may be attached to the top frame covering the opening between the four sides of the top frame. The platform allows a pet to sit comfortably within the vehicle.

The top frame and the bottom frame may be connected to one another via four connectors. The four connectors create a ramp storage area between the bottom frame and the top frame. A ramp housing may be installed to the top frame. In another example, the ramp housing may be installed to the bottom frame. The ramp housing holds the telescoping ramp when the ramp is in its non-extended mode. In one example, the top frame and the bottom frame measure 1.5 inches in diameter. In other examples, the top frame and the bottom frame's diameters may be smaller, e.g., 1 inch. In one specific example, the length and width of the frames are 40 inches and 28.2 inches, respectively. The length and width of the frames may change to accommodate different size cargo areas of vehicles. For example, the length may be between 32 and 48 inches and the width may be between 22 and 32 inches. The connectors may be 6.5 inches tall. In another example, the connectors may be smaller, such as 4 inches tall. In other examples, the connectors may between 6 inches and 7 inches tall.

The telescoping ramp is housed in the ramp housing when non-extended. The telescoping ramp may include three, four, five, etc., individual panels. In one example, each panel is 20 inches long. The upper most panel, closest to the top frame may be 19.7 inches wide, with each lower pane; slightly smaller. For example, each lower panel may be between 0.2 and 0.5 inches less wide. In one specific example, panel 218 is 14.5" wide and 17.25" long. The panel 216 is 16.25" wide and 17.25" long. The panel 214 is 18.0" wide and 17.25" long; and the panel 212 is 20.0" wide and 22.75" long. In this example, the extended telescoping ramp may be 6'3" long when fully extended. The telescoping ramp may include a handle that is used to extend the telescoping ramp. When extending the telescoping ramp, the ramp moves out of the ramp storage area and away from the front of the top frame and the front of the bottom frame. In some examples, the telescoping ramp is able to be unlocked and extended using only one hand. This allows the telescoping ramp to be extended while holding onto a pet or other object. Once extended, the pet may walk up the extended telescoping ramp and sit on the platform. The extended ramp may then be collapsed and stored in the ramp storage area. In various examples, the telescoping ramp is able to be collapsed using one hand.

The telescoping pet ramp may also include a mat. The mat may be made of neoprene. The mat may be permanently attached to the bottom frame. In some examples, the mat may also be a bumper protector. In these examples, prior to extending the telescoping ramp, the mat extends to cover a portion of the vehicle's bumper. The bumper protector sits between the telescoping ramp and the vehicle's bumper. The bumper protector may be made a padded material to enhance the protection to the bumper. The mat may be wider than the telescoping ramp to ensure that the telescoping ramp does not directly touch the bumper of the vehicle.

The mat may be attached to the front of the bottom frame. For example, the mat may be attached to the bottom frame and then may removeably connect to the top frame. In this example, the mat may be used to retain the telescoping ramp in the ramp storage. For example, the mat may have a connector that is used to attach the mat to the top frame or the platform. The connector may be Velcro or a button. When the mat is attached to the top frame or the platform and the telescoping ramp is in its non-extended state, the mat acts as a barrier to the telescoping ramp extending. In one example, the mat and the bumper protector are the same. In addition, the telescoping ramp may also include a locking mechanism that retains the telescoping ramp in its non-extended position. In this example, the handle may be used to unlock the telescoping ramp. In another example, a release separate from the handle may be used to unlock the telescoping ramp.

The telescoping ramp is designed to accommodate different ramp lengths and different ramp heights. In one example, the telescoping ramp is at least six feet in length when extended. For example, the telescoping ramp may be between 5 and 7 feet when extended. The length of the telescoping ramp may be configurable based on the available space, the need of the pet, or the height of the vehicle.

The telescoping ramp is attached to the top frame via a hinge that allows the ramp to move up and down relative to the top and bottom frames. The angle between the ground and the ramp may be controlled by the operator and the angle may be between 15 and 75 degrees when the extended ramp is positioned on the ground and ready to be used. When extending the ramp from the vehicle, the ramp may be parallel to the ground until the end of the ramp is placed on the ground. The number of panels in the telescoping ramp may be between three and six. The telescoping ramp may be as wide or nearly as wide as the length of the front frame. For example, the telescoping ramp may be the length of the top frame minus 0.5 to 1 inch. In another example, the telescoping ramp is less than the length of the top frame. For example, the width of the telescoping ramp may be between 19 inches and 20 inches in width. In a specific example, the widest width of a telescoping panel is 19.7 inches.

When installed in a vehicle, the telescoping pet ramp may act as a regular cargo area when not supporting a pet. The low-profile frame and the platform allow the telescoping pet ramp to hold cargo in the same way as the cargo area of the vehicle. In addition, various accessories may be attached to the telescoping pet ramp. For example, the telescoping pet ramp may include four or more universal sockets, e.g., 170, connected to the top frame. For example, the universal sockets may be attached to the corners of the top frame. In one example, the universal sockets are part of the top frame as illustrated in FIG. 1 and FIG. 2. In another example, the universal sockets are attached to the top frame but are separate from the top frame.

Various accessories may attach to the telescoping pet ramp via these universal sockets. For example, a cage may be connected to the top frame via the universal sockets. In this example, the cage has an entrance at the front of the cage above the telescoping ramp. The entrance allows a pet to walk up the ramp and into the cage. The cage may then be shut to ensure the safety of the pet. The mat or bumper protector may attach to the cage. Another accessory that may be installed is a pet bed. The pet bed may be a weather proof bed. In one example, the top frame includes six connectors. In this example, a bed or other accessory may be connected to four or six of the connectors. If less than all of the connectors are used, additional accessories may be installed. In one example, the top frame includes eight connectors. Four of the connectors are at the corners of the top frame. The other four connectors are located along the length of the front of the top frame and the length of the back of the top frame. Connector may be installed around the midpoint along the widths of the top frame. Other accessories that may be attached to the telescoping pet ramp include storage bins, netting, or cooling pad. Storage bins may be attached to the telescoping pet frame using one or more universal connectors. In one example, a cooling pad may be installed and then a pet bed installed on top of the cooling pad. In this example, both the cooling pad and the pet bed may be attached to the telescoping pet ramp via the universal connectors. In another example, the platform may be connected to the top frame via the universal connectors. For example, the platform may be connected to the top frame via at least four universal connectors located at the corners of the top frame.

In another example, multiple accessories are connected to the top frame. For example, a bed may be connected to four universal connectors that take up approximately 75% of the platform. The bed may extend from one side of the top frame past the telescoping ramp and attached to universal connectors that are located between the telescoping ramp and the opposite side of the top frame. A water and food bowl may be attached to another universal connector that extends from the opposite side of the top frame to the pet bed. A storage area may also be attached to yet another universal connector.

Accordingly, the telescoping pet frame may accommodate many different configurations of accessories in addition to a platform used to support the pet.

In some examples, the telescoping pet ramp may support different widths or different lengths of vehicles. For example, a portion of the top frame and a corresponding portion of the bottom fame may be telescoping. For example, the portion of top frame between a corner and the telescoping ramp storage may be telescoping. Both the front and the back of the top frame would have corresponding telescoping portions. The bottom frame also has corresponding telescoping portions. When installing the telescoping pet ramp into a vehicle, the length of the telescoping pet ramp could be extended to accommodate larger cargo areas. The telescoping portions of the frames could be locked in place using known locking mechanisms such as a pin lock, spring plunger, etc. In these examples, the platform would also having a corresponding telescoping functionality to accommodate the configurable length of the telescoping pet ramp. In another example, the width of the telescoping pet ramp may be configurable in a similar manner.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A telescoping pet ramp comprising:
   a bottom frame having a rectangular shape and fasteners configured to tether the telescoping pet ramp to an interior of a vehicle;
   a top frame having four sides creating a rectangular shape and an opening between the four sides;
   a platform attached to the top frame covering the opening between the four sides of the top frame;
   at least four connectors connecting the bottom frame and the top frame at each corner of the bottom frame and top frame;
   a ramp storage area between the bottom frame and the top frame; and
   the telescoping ramp being movable with respect to a front of the top frame and a front of the bottom frame, wherein the ramp storage area retains the telescoping ramp when the telescoping ramp is in a non-extended state; and
   a bumper protector attached to the front of the bottom frame and adapted for selective movement between two positions, including a first position in which the bumper protector sits between a bumper of the vehicle and the telescoping ramp in an extended state, and a second position in which a connector of the bumper protector secures the telescoping ramp within the ramp storage area by releasably attaching to the platform or top frame.

2. The telescoping pet ramp of claim 1, wherein the telescoping ramp is adapted for selective locking in the non-extended state.

3. The telescoping pet ramp of claim 1, wherein the telescoping ramp is at least six feet in length when extended.

4. The telescoping pet ramp of claim 1, wherein at the least four connectors are between six inches and seven inches in height.

5. The telescoping pet ramp of claim 1, further comprising at least four universal sockets connected to the top frame for selectively attaching a number of universally mating accessories to the top frame.

6. The telescoping pet ramp of claim 5, wherein the at least four universal sockets are adapted for selectively connecting a cage to the top frame.

7. The telescoping pet ramp of claim 5, wherein the at least four universal sockets are adapted for selectively connecting a pet bed to the top frame.

8. The telescoping pet ramp of claim 5, wherein the at least four universal sockets are adapted for selectively connecting a cooling pad to the top frame.

9. The telescoping pet ramp of claim 5, wherein the at least four universal sockets are adapted for selectively connecting a storage unit to the top frame.

10. The telescoping pet ramp of claim 5, wherein the platform is connected to the top frame via the at least four universal sockets.

11. The telescoping pet ramp of claim 1, wherein a width of the telescoping ramp is a length of the front of the top frame.

12. The telescoping pet ramp of claim 1, wherein a width of the telescoping ramp is less than a length of the front of the top frame.

13. The telescoping pet ramp of claim 1, wherein the platform is waterproof.

14. The telescoping pet ramp of claim 1, wherein a width of each of the bottom frame, the top frame, the telescoping pet ramp, and the platform are adapted for selective adjustment by corresponding telescoping portions, the width of the telescoping pet ramp being based on the front of the top frame.

15. The telescoping pet ramp of claim 14, wherein the corresponding telescoping portions are adapted for selective locking by corresponding locking mechanisms to lock at a selected width.

16. The telescoping pet ramp of claim 1, wherein the top frame is comprised of aluminum.

17. The telescoping pet ramp of claim 1, wherein the top frame is comprised of a carbon composite.

18. The telescoping pet ramp of claim 1, wherein the telescoping ramp comprises multiple telescoping segments, each telescoping segment being formed as a planar panel with a constant slope.

* * * * *